United States Patent
Osada et al.

(10) Patent No.: US 9,295,240 B2
(45) Date of Patent: Mar. 29, 2016

(54) METHOD FOR PRODUCING FISHING NET AND FISHING NET PRODUCED BY THE METHOD

(75) Inventors: Osamu Osada, Aichi (JP); Toshihiko Matsui, Aichi (JP); Ryoichi Hazama, Osaka (JP)

(73) Assignee: OSADA FISHING NET CO., LTD., Aichi (JP)

( * ) Notice: Subject to any disclaimer, the term of this patent is extended or adjusted under 35 U.S.C. 154(b) by 1151 days.

(21) Appl. No.: 12/411,763

(22) Filed: Mar. 26, 2009

(65) Prior Publication Data

US 2010/0122486 A1    May 20, 2010

(30) Foreign Application Priority Data

Nov. 17, 2008 (JP) ................................. 2008-292873

(51) Int. Cl.
*A01K 75/00* (2006.01)
*D06P 1/00* (2006.01)

(52) U.S. Cl.
CPC ............... *A01K 75/00* (2013.01); *D06P 1/0096* (2013.01)

(58) Field of Classification Search
CPC .............................. A01K 75/00; D06P 1/0096
USPC ............... 43/4, 4.5, 7–14; 87/12, 53; 28/169; 8/529, 478, 480, 506, 508–517
See application file for complete search history.

(56) References Cited

U.S. PATENT DOCUMENTS

| | | | | | |
|---|---|---|---|---|---|
| 2,810,229 | A | * | 10/1957 | Allyn | 43/4.5 |
| 3,175,319 | A | * | 3/1965 | Gonsalves | 43/4.5 |
| 3,416,877 | A | * | 12/1968 | Gantz et al. | 8/584 |
| 3,493,316 | A | * | 2/1970 | Hilscher et al. | 8/650 |
| 3,622,264 | A | * | 11/1971 | Brown et al. | 8/539 |
| 3,652,198 | A | * | 3/1972 | Farber et al. | 8/480 |
| 4,044,432 | A | * | 8/1977 | Ebata | 43/7 |
| 4,218,217 | A | * | 8/1980 | Redd, Jr. | 8/478 |
| 4,378,725 | A | * | 4/1983 | Hospers et al. | 87/12 |
| 4,457,959 | A | * | 7/1984 | Dornheim et al. | 427/379 |
| 5,131,914 | A | * | 7/1992 | Kelley | 8/449 |
| 5,647,160 | A | * | 7/1997 | Anderson | 43/10 |
| 5,819,464 | A | * | 10/1998 | Jovanovich | 43/10 |
| 6,669,019 | B2 | * | 12/2003 | Tsurumaki et al. | 206/389 |

FOREIGN PATENT DOCUMENTS

| | | |
|---|---|---|
| JP | 38-004976 | 3/1963 |
| JP | 38-013473 | 7/1963 |
| JP | 49-098374 | 8/1974 |
| JP | 49-33434 | 9/1974 |
| JP | 52-049187 | 4/1977 |
| JP | 56-018065 | 2/1981 |
| JP | 58-125977 | 8/1983 |
| JP | 59-159268 | 10/1984 |
| JP | 03-069684 | 3/1991 |
| JP | 06-033314 | 2/1994 |

OTHER PUBLICATIONS

English abstract for JP 06-033314.
English abstract for JP 03-069684.

* cited by examiner

*Primary Examiner* — Darren W Ark
*Assistant Examiner* — Danielle Clerkley
(74) *Attorney, Agent, or Firm* — Fildes & Outland, P.C.

(57) ABSTRACT

A method for producing a fishing net is disclosed. Some sections and the other sections of the net are respectively formed of threads different in dyeing property, and then the net is dyed.

7 Claims, 2 Drawing Sheets

LENGTHWISE DIRECTION →

| | FIRST COLOR SERIES | SECOND COLOR SERIES | THIRD COLOR SERIES | FOURTH COLOR SERIES | FIFTH COLOR SERIES |
|---|---|---|---|---|---|
| ↓ WIDTHWISE DIRECTION | FIRST COLOR DENSITY | FIRST COLOR DENSITY | FIRST COLOR DENSITY | FIRST COLOR DENSITY | FIRST COLOR DENSITY |
| | FIRST COLOR SERIES | SECOND COLOR SERIES | THIRD COLOR SERIES | FOURTH COLOR SERIES | FIFTH COLOR SERIES |
| | SECOND COLOR DENSITY | SECOND COLOR DENSITY | SECOND COLOR DENSITY | SECOND COLOR DENSITY | SECOND COLOR DENSITY |
| | FIRST COLOR SERIES | SECOND COLOR SERIES | THIRD COLOR SERIES | FOURTH COLOR SERIES | FIFTH COLOR SERIES |
| | THIRD COLOR DENSITY | THIRD COLOR DENSITY | THIRD COLOR DENSITY | THIRD COLOR DENSITY | THIRD COLOR DENSITY |
| | FIRST COLOR SERIES | SECOND COLOR SERIES | THIRD COLOR SERIES | FOURTH COLOR SERIES | FIFTH COLOR SERIES |
| | FOURTH COLOR DENSITY | FOURTH COLOR DENSITY | FOURTH COLOR DENSITY | FOURTH COLOR DENSITY | FOURTH COLOR DENSITY |

FIG 1

LENGTHWISE DIRECTION →

| FIRST COLOR SERIES FIRST COLOR DENSITY | SECOND COLOR SERIES FIRST COLOR DENSITY | THIRD COLOR SERIES FIRST COLOR DENSITY | FOURTH COLOR SERIES FIRST COLOR DENSITY | FIFTH COLOR SERIES FIRST COLOR DENSITY |
|---|---|---|---|---|
| FIRST COLOR SERIES SECOND COLOR DENSITY | SECOND COLOR SERIES SECOND COLOR DENSITY | THIRD COLOR SERIES SECOND COLOR DENSITY | FOURTH COLOR SERIES SECOND COLOR DENSITY | FIFTH COLOR SERIES SECOND COLOR DENSITY |
| FIRST COLOR SERIES THIRD COLOR DENSITY | SECOND COLOR SERIES THIRD COLOR DENSITY | THIRD COLOR SERIES THIRD COLOR DENSITY | FOURTH COLOR SERIES THIRD COLOR DENSITY | FIFTH COLOR SERIES THIRD COLOR DENSITY |
| FIRST COLOR SERIES FOURTH COLOR DENSITY | SECOND COLOR SERIES FOURTH COLOR DENSITY | THIRD COLOR SERIES FOURTH COLOR DENSITY | FOURTH COLOR SERIES FOURTH COLOR DENSITY | FIFTH COLOR SERIES FOURTH COLOR DENSITY |

WIDTHWISE DIRECTION →

METHOD FOR PRODUCING FISHING NET AND FISHING NET PRODUCED BY THE METHOD

FIELD OF THE INVENTION

The present invention relates to a method for producing a fishing net and a fishing net produced by the method.

BACKGROUND OF THE INVENTION

A gillnet is known as a type of fishing net. It has been empirically known that a fish haul is varied depending on the coloration of such a gillnet. Accordingly, by adopting such gillnet colors as hardly visible to fish, a fish haul improvement can be achieved. However, the colors hardly visible to fish are varied depending on the variation of the color of the sea bottom and the variation of the sunlight. Thus, gillnets are often dyed by the fishery workers, on the basis of the fishery workers' experiences in such colors that are hardly visible to fish in the waters where fishing is conducted. Specifically, the fishery workers purchase monochromatic fishing nets and the fishing nets are dyed by the fishery workers themselves, and thus the fish haul improvement is achieved.

Alternatively, fishing net manufacturers, at the manufacturing stage of the fishing nets, vary the color horizontally, namely, in the lengthwise directions of the fishing nets on the basis of the demands of fishery workers. This color variation is referred to as "paneling." In this technique, along the lengthwise direction of a fishing net, which is the same as the mechanical fishing-net knitting direction, the fishing net is cut into sections each having a predetermined length much longer than the widthwise length thereof, the thus cut respective sections of the fishing net are dyed separately, and finally, the respective dyed sections of the fishing net are joined by hand sewing to complete the fishing net. In general, the number of the meshes joined in this case is about 30 to 120, and consequently, the cost increase in the production of a fishing net, ascribable to this cutting and joining process, accounts for about a few percent of the product price. Practically, a fishing net is about 2.5 to 15 m in width and 200 to 1200 m in length.

A technique for varying the color from section to section is described in U.S. Pat. No. 5,819,464. In this technique, the respective sections of a fishing net are dyed with different dyes varying in color from section to section, and accordingly it is possible to give different colors in the water depth direction, namely, in the widthwise direction of the fishing net. In this way, as compared to the case where the color is varied solely in the lengthwise direction of a fishing net, the fish haul may be expected to be further improved.

However, the method of U.S. Pat. No. 5,819,464 takes considerable time and labor, because as described above the respective sections of a fishing net are dyed with different dyes varying in color from section to section, and accordingly dyeing is required to be repeated the same times as the number of the colors. Additionally, aside from the number of the colors, the process of dyeing the respective sections of a fishing net with dyes varying in color from section to section also takes considerable time and labor because such a process requires, for example, to select one of the respective sections from the one continuously formed fishing net and to dye the particular selected section at a time.

SUMMARY OF THE INVENTION

An object of the present invention is to impart different colors to a fishing net, in particular, to a plurality of sections of the fishing net along the widthwise direction thereof by using a simple and easy technique.

For the purpose of attaining the object, in the present invention, some sections and the other sections of the net are respectively formed of threads having different dyeing properties, and the thus formed net is dyed.

According to this method, for example, a sole process of dyeing the whole net at a time by using a single type of dye results in some sections and the other sections being dyed in different colors or different color densities.

According to the present invention, the threads having different dyeing properties can be formed from polymers different in type or polymers different in copolymerization ratio.

Therefore, according to the present invention, a simple technique enables the respective sections of a fishing net to be dyed different colors or different color densities in a single dyeing process.

BRIEF DESCRIPTION OF THE DRAWINGS

FIG. 1 is a diagram schematically illustrating a configuration of a fishing net of the present invention.

DESCRIPTION OF THE PREFERRED EMBODIMENT

Figure 2:
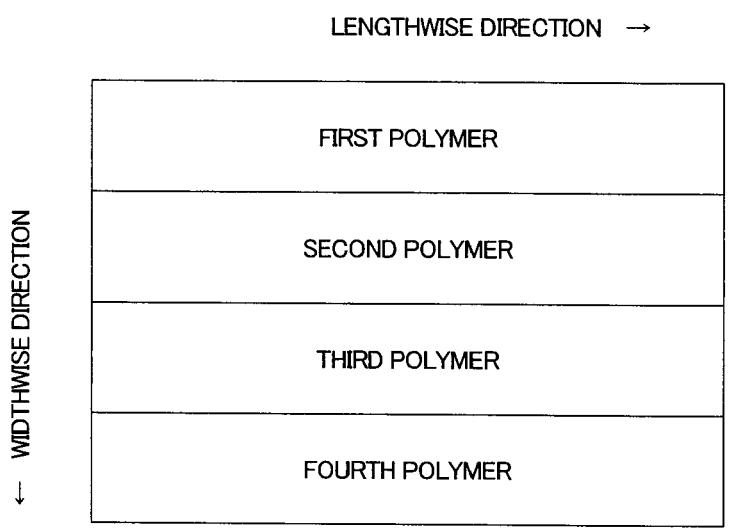
FIG. 2 is a diagram schematically illustrating the configuration of a fishing net before dyeing, based on the present invention.

As shown in FIG. 1, a fishing net obtained by the method of the present invention allows the respective sections thereof to have a variation of colors or variation of color densities (saturation) varying from section to section, not only in the lengthwise direction thereof, namely, the horizontal direction at the time of use thereof but in the widthwise direction thereof, namely, the water depth direction at the time of use thereof. The color variation or color density variation along the lengthwise direction can be attained by joining, with the aid of hand sewing, fishing nets different in color or color density in the same manner as the known technique. The cost increase in this case is also of the same order as in the above-described conventional case.

The color variation or color density variation along the widthwise direction can be attained by forming some portions and the other portions along the widthwise direction of the fishing net respectively with threads different in dyeing property and by thereafter dyeing the thus formed fishing net.

As the threads different in dyeing property, used in the present invention, the following are quoted. Examples of the threads different in dyeing property include threads each formed of polymers different in type. Examples of nylon threads different in polymer type include threads formed of nylon 6, threads formed of nylon 66 and threads formed of nylon 12.

Alternatively, even when starting from one type of polymers, by modifying the chemical structure thereof, such modified polymers can be made to form threads different in dyeing property. For example, when a thread made of nylon 6 is dyed with an acidic dye, by chemically modifying the amino groups of nylon 6, the reaction between the dye and the amino groups of nylon 6 is varied, and the nylon thus modified can be made different in dyeing property from the original nylon 6. Specifically, by using threads made of a nylon 6 which has undergone a reaction in the amino terminal groups thereof with a compound having a plurality of amino groups, the threads can be made to be deeply dyed. In contrast to this case, by using the threads made of a nylon 6 in which the amino terminal groups have been blocked by a chemical reaction, the reaction between the threads and the dye is inhibited and thus the threads can be lightly dyed. Further, by introducing a cationic dye-dyeable anionic group into the nylon 6 polymer, the threads formed of such a nylon 6 can also be converted into cationic dye-dyeable threads that are dyed in colors different from the color of common dyed nylon 6, in a form of being contaminated by the acidic dye.

By using threads made of a copolymer, the dyeing property of the threads can be varied. For example, by using threads made of a copolymer between nylon 6 and nylon 66 under the condition that the copolymerization ratio of nylon 6/nylon 66 is varied, the dyeing property with respect to an acidic dye or a metal complex dye can be made to undergo variation. In other words, when dyeing is made with a single acidic dye, the threads made of the polymers different in the copolymerization ratio of nylon 6/nylon 66 can be dyed in from deep to light colors, depending on the different copolymerization ratios. Specifically, threads having a copolymerization ratio of nylon 6/nylon 66=95/5 to 80/20 may be used. This color variation tendency is conceivably due to the dyeing property varied by the crystallization conditions of the copolymerized nylon, in such a way that the threads having a higher degree of crystallization, namely, the threads having the copolymerization ratio of nylon 6/nylon 66 of 95/5 are lightly dyed, and the threads having a lower degree of crystallization, namely, the threads having the copolymerization ratio of nylon 6/nylon 66 of 80/20 are deeply dyed.

Alternatively, by using so-called dope-dyed threads containing a pigment added to specified portion thereof, the sections using the spun-dyed threads and the other sections can be dyed so as to have different colors. Even if such dope-dyed threads and the threads containing no pigments added thereto are the same in the dyeing property (reactivity) with respect to a dye, the threads can be finished in different colors depending on the presence or absence of the pigment.

Even if the total fineness of the threads used at the time of knitting a net are the same, by varying the fineness of the filaments forming the threads, the threads can be made to be varied in dyeing property. For example, it is possible to use the technique in which the net portions knitted with bundles of filaments having a thin fineness are deeply dyed because even the cores of the fibers are dyed, and on the other hand, the net portions knitted with bundles of filaments having a thick fineness are lightly dyed because the cores of the fibers are not dyed.

As the threads different in dyeing property, the above-described examples are quoted, but the present invention is not limited to these examples. It is to be noted that although the use of the above-described threads enables to produce a netting material having a varying dyeing property, it is not preferable to use threads extremely different in thread quality from the viewpoint of the overall structure of the whole net. In particular, in consideration of the heat received in the heat setting process and the dyeing process subsequent to the net knitting, it is preferable to use threads close to each other in shrinkage rate.

A detailed technique for varying the color or color density along the widthwise direction of the fishing net is described in detail. The above-cited plurality of types of threads different in the dyeing property such as dyeing rate, for example, nylon threads are prepared and these nylon threads are divided into sets each having a necessary number of threads; and a net is knitted by using such sets of threads with a net knitting machine. Consequently, a fishing net before dyeing as shown in FIG. 2 is obtained. This fishing net is, as shown in the figure, divided into a plurality of sections along the widthwise direction and the respective sections are respectively formed of the different polymers such as different types of nylon threads.

At the next stage, this fishing net is dyed, for example, with an Overmyer dyeing machine by using a single dye. Then, owing to the different dyeing properties, namely, the different dyeing rates of the different nylon threads, there is obtained a fishing net in which the respective sections are deeply or lightly colored in the color series associated with a dye used, in other words, a fishing net in which the respective sections are different in color density from each other. By using different dyes, there can be obtained a plurality of types of fishing nets which are deeply or lightly colored in the color series of the dyes used.

The thus obtained fishing nets may be used as they are, or alternatively, may be used, as shown in FIG. 1, as combinations of the nets of different color series prepared in the following way: the fishing nets are each cut into sections of a predetermined length along the lengthwise direction, and as shown in FIG. 1, a plurality of sections different in color series are joined.

Although FIG. 1 illustrates as an example the configuration in which the respective sections are arranged parallel to each other along the widthwise direction of the fishing net wherein the respective sections are rectangular, such configuration is not limited to this configuration and a configuration in which the respective sections are allowed to be optional in shape is also possible.

The advantages of the method of the present invention are as follows.

For example, it is also possible to join, after dyeing, along the widthwise direction of a fishing net by hand sewing in the same manner as in the conventional paneling technique. However, in this case, in contrast to the paneling technique in which joining is made at a small number of positions along the lengthwise direction of the fishing net, joining is required to be conducted over the whole length along the lengthwise direction, and thus specifically, 3000 to 20000 meshes are required to be joined. Consequently, the production cost of such a fishing net is extremely increased, and for example, the production cost may be estimated to be a few times the price of a conventional product. Accordingly, it is practically impossible to adopt the above-described technique involving widthwise joining.

Alternatively, for example, in the same manner as in the technique described in U.S. Pat. No. 5,819,464, a fishing net is divided into sections along the widthwise direction, and the divided sections may be respectively dyed with different dyes into different colors. In this case, however, netting material pieces each small in quantity are required to be dyed; thus, for example, on the assumption that a run of dyeing takes about 1 hour, the dyeing of a fishing net needs a considerably long time, and the production cost of the fishing net is thereby increased. Additionally, such a dyeing for every section cannot be conducted with a standard machine such as the above-described Overmyer dyeing machine, accordingly dyeing is inevitably conducted by hand working for a small number of sections at one time, and thereby takes time and labor, and additionally it is difficult to attain such a dye fastness sufficient to bear fish catching in the ocean.

On the contrary, according to the method of the present invention, by applying a common dyeing method using only a single dye, it is possible to dye a fishing net in colors or color densities varying along the widthwise direction thereof. Consequently, the cost increase in the dyeing process is avoided, and additionally a dye fastness comparable to the dye fastness attained by common dyeing methods can be attained.

It is to be noted that in the method for producing a fishing net of the present invention, optional polymers may also be used, in addition to the polymers such as the above-described nylons, namely, polyamide polymers, as long as such optional polymers are capable of being made different from each other in dyeing property.

For example, a fishing net having the sections thereof different in color or color density from each other can also be produced as follows: a fishing net is formed by properly using in the respective sections thereof the threads made of a first polymer which is satisfactorily dyed with a first dye but is not satisfactory in dyeing property when a second dye is used and the threads made of a second polymer which is not satisfactory in dyeing property when the first dye is used but is satisfactorily dyed with the second dye; then the thus formed fishing net is dyed twice, first with the first dye and second with the second dye for the purpose of producing the intended fishing net.

Moreover, by applying a technique different from common techniques in which net sections are joined by sewing, a fishing net varying in color or color density along the lengthwise direction thereof can be produced by using the threads formed of polymers different in dyeing property not only in the respective sections along the widthwise direction of a fishing net but also in the respective sections along the lengthwise direction of the fishing net.

EXAMPLES

Examples of the present invention are described.

Example 1

A fishing net having the number of meshes of 60 along the widthwise direction was produced. In this case, the threads used for forming the first to 15th mesh in the widthwise direction of the fishing net were formed by bundling 20 filaments (each filament has fineness of about 400 dtex) using a copolymerized nylon having a copolymerization ratio of nylon 6/nylon 66 of 95/5. Similarly, the threads used for forming the 16th to 30th mesh of the fishing net were formed by bundling 20 filaments (each filament has fineness of 400 dtex) using a copolymerized nylon having a copolymerization ratio of nylon 6/nylon 66 of 90/10, the threads used for forming the 31st to 45th mesh of the fishing net were formed by bundling 20 filaments (each filament has fineness of 400 dtex) using a copolymerized nylon having a copolymerization ratio of nylon 6/nylon 66 of 85/15, and the threads used for forming the 46th to 60th mesh of the fishing net were formed by bundling 20 filaments (each filament has fineness of 400 dtex) using a copolymerized nylon having a copolymerization ratio of nylon 6/nylon 66 of 80/20.

By using these bundled filaments, a fishing net having a mesh size of 120 mm and a total width dimension of 7.2 m was obtained.

Such a fishing net was cut to a length of 100 m, and dyed under the conditions of a dyeing temperature of 90° C. and a dyeing time of 30 minutes with an Overmyer dyeing machine by using a gray dye prepared by mixing Suminol Milling Gray (trade name, acidic dye manufactured by Sumitomo Chemical Co., Ltd.) and Taoka Dyestuff Lanyl Gray (trade name, metal complex dye, manufactured by Taoka Chemical Co., Ltd.).

Thus, there was obtained a fishing net which was wholly dyed gray and in which the color was deepened in the order of the first to 15th mesh, 16th to 30th mesh, 31st to 45th mesh and 46th to 60th mesh along the widthwise direction.

Example 2

A fishing net was knitted by using the threads used for forming the first to 15th mesh of the fishing net of Example 1 in the same manner for the first to 15th mesh, the threads used for forming the 46th to 60th mesh of the fishing net of Example 1 for the 16th to 30th mesh, the threads used for forming the 31st to 45th mesh of the fishing net of Example 1 in the same manner for the 31st to 45th mesh, and the threads used for forming the 16 to 30th mesh of the fishing net of Example 1 for the 46th to 60th mesh. In the same manner as in Example 1, the knitted fishing net was dyed under the conditions of a dyeing temperature of 90° C. and a dyeing time of 30 minutes with an Overmyer dyeing machine by using a green dye prepared by mixing Suminol Milling Green (trade name, acidic dye manufactured by Sumitomo Chemical Co., Ltd.) and Taoka Dyestuff Lanyl Green (trade name, metal complex dye, manufactured by Taoka Chemical Co., Ltd.).

Thus, there was obtained a fishing net which was wholly dyed green and in which the color was deepened in the order of the first to 15th mesh, 46th to 60th mesh, 31st to 45th mesh and 16th to 30th mesh along the widthwise direction.

Example 3

A fishing net was knitted by using the threads used for forming the 31st to 45th mesh of the fishing net of Example 1 for the first to 15th mesh, the threads used for forming the first to 15th mesh of the fishing net of Example 1 for the 16th to 30th mesh, the threads used for forming the 16th to 30th mesh of the fishing net of Example 1 for the 31st to 45th mesh, and the threads used for forming the 46th to 60th mesh of the fishing net of Example 1 in the same manner for the 46th to 60th mesh. In the same manner as in Example 1, the knitted fishing net was dyed under the conditions of a dyeing temperature of 90° C. and a dyeing time of 30 minutes with an Overmyer dyeing machine by using a blue dye prepared by mixing Suminol Milling Blue (trade name, acidic dye manufactured by Sumitomo Chemical Co., Ltd.) and Taoka Dyestuff Lanyl Blue (trade name, metal complex dye, manufactured by Taoka Chemical Co., Ltd.).

Thus, there was obtained a fishing net which was wholly dyed blue and in which the color was deepened in the order of the 31st to 45th mesh, first to 15th mesh, 16th to 30th mesh and 46th to 60th mesh along the widthwise direction.

Example 4

A fishing net having the number of meshes of 60 along the widthwise direction was produced. In this case, the threads used for forming the first to 15th mesh in the widthwise direction of the fishing net were formed by bundling 20 filaments (each filament has fineness of about 400 dtex) using a copolymerized nylon having a copolymerization ratio of nylon 6/nylon 66 of 95/5. Similarly, the threads used for forming the 16th to 30th mesh of the fishing net were formed by bundling 10 filaments (each filament has fineness of about 800 dtex) using the same copolymerized nylon, the threads used for forming the 31st to 45th mesh of the fishing net were formed by bundling 5 filaments (each filament has fineness of about 1600 dtex) using the same copolymerized nylon, and the threads used for forming the 46th to 60th mesh of the fishing net were formed by bundling 2 filaments (each filament has fineness of about 4000 dtex) using the same copolymerized nylon.

By using these bundled filaments, a fishing net having a mesh size of 120 mm and a total width dimension of 7.2 m was obtained.

Such a fishing net was cut to a length of 100 m, and dyed under the same dyeing conditions as for the fishing net of Example 1 with an Overmyer dyeing machine.

Thus, there was obtained a fishing net which was wholly dyed gray and in which the color was lightened in the order of the first to 15th mesh, 16th to 30th mesh, 31st to 45th mesh and 46th to 60th mesh along the widthwise direction.

Example 5

A fishing net was knitted by using the threads used for forming the 46th to 60th mesh of the fishing net of Example 4 for the first and 15th mesh, the threads used for forming the 31st to 45th mesh of the fishing net of Example 4 for the 16th to 30th mesh, the threads used for forming the 16th to 30th mesh of the fishing net of Example 4 for the 31st to 45th mesh, and the threads used for forming the first to 15th mesh of the fishing net of Example 4 for the 46th to 60th mesh. The knitted fishing net was dyed with the Overmyer dyeing machine in the same manner as in Example 4 under the same dyeing conditions as in Example 2.

Thus, there was obtained a fishing net which was wholly dyed green and in which the color was deepened in the order of the first to 15th mesh, 16th to 30th mesh, 31st to 45th mesh and 46th to 60th mesh along the widthwise direction.

Example 6

The thus obtained fishing nets of Examples 1 to 5 were each cut to a length of 100 m in the lengthwise direction, and the cut fishing nets were joined by sewing in the lengthwise direction thereof. Thus, there was obtained a fishing net having a total width of 7.2 m and a total length of 500 m in which the color series was varied every 100 m along the lengthwise direction and additionally the density of each of the color series was varied every 1.8 m along the widthwise direction.

The invention claimed is:

1. A method for producing a fishing net, the method including the steps of:
preparing threads that are respectively formed of polymers that are different in copolymerization ratio for exhibiting different dyeing property;
forming a plurality of distinct sections of the fishing net from the threads that are respectively different in dyeing property for each section, each section being formed of threads having a dyeing property and each section including threads having the same dyeing property and the dyeing property of the other sections each being a different dyeing property; and
dyeing the thus formed entire net at one time using only a single dye to obtain a net having a varying color or color density by section.

2. A fishing net produced by the method according to claim 1, wherein the plurality of distinct sections are dyed in different colors or different color densities.

3. The method for producing a fishing net according to claim 1, including the step of joining a plurality of the formed fishing nets in a lengthwise direction.

4. The method for producing a fishing net according to claim 3, wherein each of the plurality of joined fishing nets is of a different color.

5. A method for producing a fishing net, the method including the steps of:
forming a fishing net portion having a plurality of distinct sections in a widthwise direction, wherein each section is respectively formed of a thread, wherein the thread forming one said distinct section is formed of a polymer that is different in copolymerization ratio than a polymer forming the thread of another said distinct section; and
dyeing the thus formed entire fishing net portion at one time using only a single dye to obtain a net having a varying color or color density be section.

6. The method for producing a fishing net according to claim 5, including the step of joining a plurality of said fishing net portions in a lengthwise direction.

7. A method for producing a fishing net, the method including the steps of:
preparing threads in which total fineness of the threads is the same and fineness of the filaments forming the respective threads is different for exhibiting different dyeing property;
forming a plurality of distinct sections of the fishing net from the threads that are respectively different in dyeing property for each section, each section being formed of threads having a dyeing property and each section including threads having the same dyeing property and the dyeing property of the other sections each being a different dyeing property; and
dyeing the thus formed net to obtain a net having a varying color or color density by section.

* * * * *